(12) United States Patent
Villagomez et al.

(10) Patent No.: US 6,694,408 B1
(45) Date of Patent: Feb. 17, 2004

(54) SCALABLE REPLACEMENT METHOD AND SYSTEM IN A CACHE MEMORY

(76) Inventors: Javier Villagomez, 846 Printempo Pl., San Jose, CA (US) 95134; Mayank Gupta, 480 Palmetto Dr., Sunnyvale, CA (US) 94086; Edward T. Pak, 19834 Glen Brae Dr., Sunnyvale, CA (US) 94086

(*) Notice: Subject to any disclaimer, the term of this patent is extended or adjusted under 35 U.S.C. 154(b) by 0 days.

(21) Appl. No.: 09/562,062

(22) Filed: May 1, 2000

(51) Int. Cl.[7] ............................................. G06F 12/00
(52) U.S. Cl. ......................... 711/133; 711/134; 711/128
(58) Field of Search ................................ 711/128, 133, 711/134

(56) References Cited

U.S. PATENT DOCUMENTS 6,490,654 B2 * 12/2002 Wickeraad et al. ......... 711/133
6,516,384 B1 * 2/2003 Clark et al. ................ 711/109
2002/0010839 A1 * 1/2002 Tirumala et al. ........... 711/133

* cited by examiner

*Primary Examiner*—Kevin Verbrugge
(74) *Attorney, Agent, or Firm*—IP Strategy Group, P.C.

(57) ABSTRACT

The invention provides a system and method for executing a replacement selection algorithm embedded in each associativity of a cache memory architecture. Each associativity in a cache has an internal control logic that governs the process for replacing a cache line when a certain condition occurs, such as a presence of a TagHit. A designated set of control signals is used in an associativity control logic for corresponding with an external control logic. An associativity control logic within an associativity provides an internal capability to determine whether a TagHit condition occurs as well as volunteering the associativity for replacement. The preferred replacement algorithm is implemented using an approximation to Not the Most Recently Used Associativity (NMRU).

14 Claims, 3 Drawing Sheets

SCALABLE REPLACEMENT METHOD AND SYSTEM IN A CACHE MEMORY

BACKGROUND INFORMATION

1. Field of the Invention

The invention relates to cache memories, and particularly to a replacement algorithm in a cache memory architecture.

2. Description of Related Art

In a cache memory design, one of the challenges is to maintain data integrity in a cache with an intelligent, efficient, and cost-effective replacement algorithm. Functions of a cache memory are typically divided into an instruction cache section for storing instructions and/or a data cache section for storing data close to an execution unit. A cache request to a cache memory causes a TagHit or a TagMiss condition. A TagHit, where a TagHit signal is asserted, indicates that the requested data exist in the cache. A TagMiss, where a TagHit signal is deasserted, indicates that the requested data is not present in cache, at which time a processor may make a request to a system or secondary memory to locate the requested data.

An associativity with a TagHit or TagMiss condition needs to be known for future use. If there is a TagMiss condition, one associativity is selected for replacement. The replacement selection is made by a replacement algorithm, which is a subset of the external control logic. The external control logic supports the functionalities for detecting associativity with TagHit, enabling only one associativity at a time, selecting an associativity to be replaced, and enabling all associativities at the same time to find the associativity with a TagHit condition.

One conventional solution designs associativity selection or replacement algorithm for cache for a specific number of associativities. When the number of associativities increases or decreases, the replacement algorithm is modified to support a new configuration. Another conventional approach adds the required logic for an n-set associativity but uses only a portion of logic for a subset of associativities. Such implementation is inefficient.

Associativity selection for cache accesses requires one signal per associativity to detect if the current access is a Tag Hit. This signal is asserted if the requested data currently exist in cache. A Valid signal is used to flag if the cache line is valid or not valid. A Lock signal is used to flag if the cache line is locked or not lock. If the replacement algorithm implemented is Not the Most Recently Used (NMRU), the Most Recently Used (MRU) signal is needed.

In a conventional replacement selection block, a replacement algorithm, miss queue and control logic are implemented external to a cache memory array. The conventional replacement algorithm block selects one associativity if there is not any TagHit signal asserted. The miss queue block maintains or stores the associativity selected by the conventional replacement algorithm to be used when the data is send by a system memory. The control logic is used to enable or start read and write operations to the cache memory based on information from the replacement algorithm and the instruction pipe unit or fetch unit. A shortcoming of this conventional replacement selection circuit is the high number of handshake signals that are required between a cache memory.

Another shortcoming in conventional associativity selection for cache requires one signal per associativity for detecting if a current access is a TagHit. If the access results in a TagHit, then that signifies that data currently exists in cache However, if the access is a Miss condition or the associativity needs to be refilled, then one signal per associativity is required to select the specific associativity to be accessed. Thus, in traditional implementations, two routing paths per associativity are used to detect TagHit conditions and for replacement/refill selection. The complexity of signal routing increases as the number of associativities increases.

Accordingly, it is desirable to have a scalable replacement algorithm for associativity selection in a cache memory to increase the cache access time while reducing signal routing complexity.

SUMMARY OF THE INVENTION

The invention provides a system and method for executing a replacement selection algorithm embedded in each associativity of a cache memory architecture. Each associativity in a cache has an internal control logic that governs the process for replacing a cache line when a certain condition occurs, such as a presence or absence of a TagHit. A designated set of control signals is used in associativity control logic for corresponding to external control logic. An associativity control logic within associativity provides an internal capability to determine whether a TagHit condition occurs as well as volunteering the associativity for replacement. The preferred replacement algorithm is implemented using an approximation to Not the Most Recently Used Associativity (NMRU).

Advantageously, the number of signals for communicating between a cache and an external control logic are the same. If the number of associativities increases in a cache, the control logic within associativity or the external control logic does not need to be modified to accommodate for the changes in the number of associativities. Therefore, the replacement selection provides a flexible modular approach while avoiding changes in associativity control logic or in an external control logic. Additionally, the fixed number of signals in an associativity control logic reduces the routing complexity between an associativity and an external control logic in manufacturing of an integrated circuit chip.

DETAILED DESCRIPTION OF PREFERRED EMBODIMENT

Figure 1:
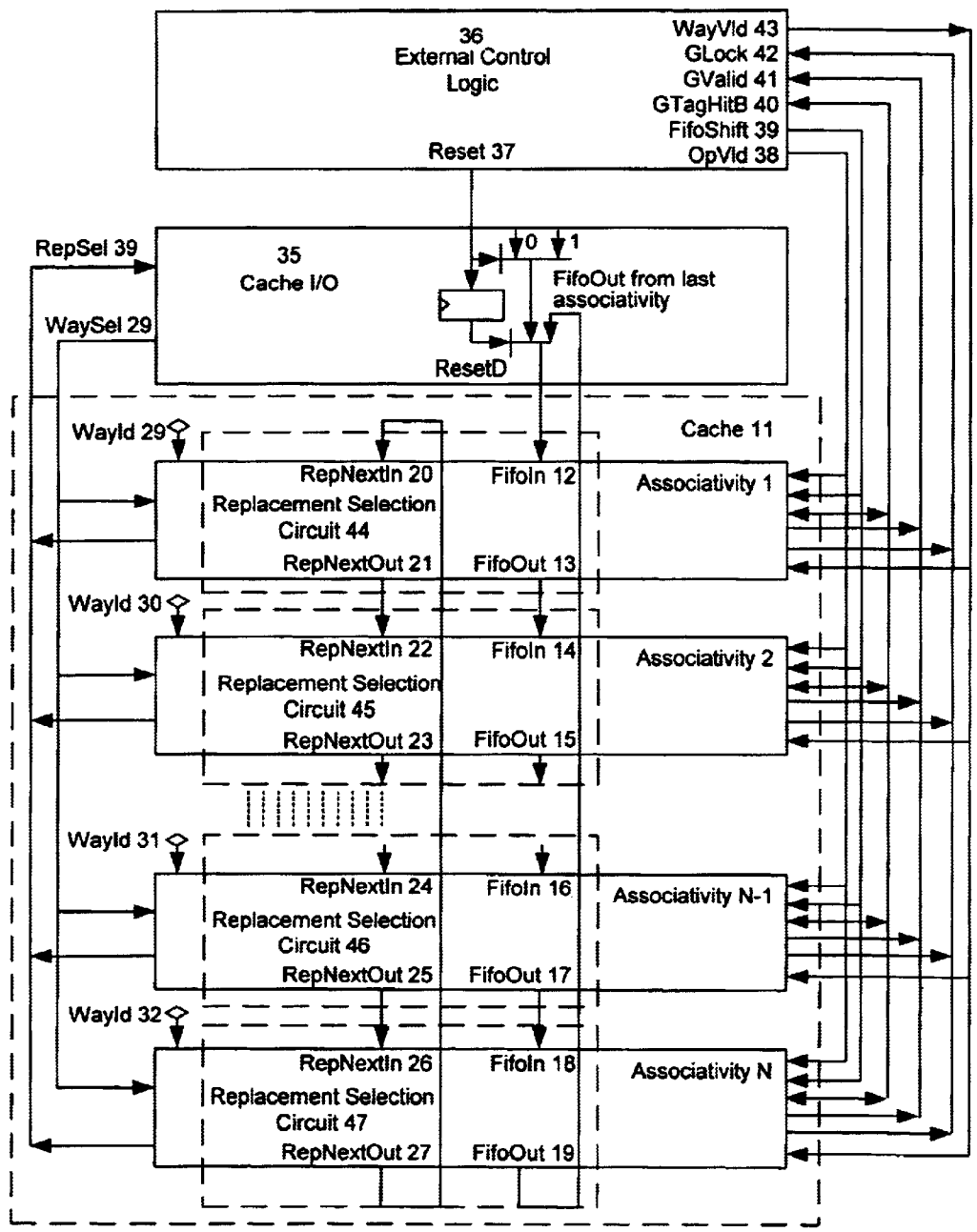
FIG. 1 is an architectural diagram illustrating a scalable replacement cache circuit in a cache memory architecture in accordance with the present invention.

FIG. 1 is an architectural diagram illustrating a scalable replacement cache circuit 11 in a cache memory architecture 10 with associativities 1, 2, . . . , N−1, and N. Each associativity has its own internal replacement selection circuit. Associativity 1 has a replacement selection circuit 44, associativity 2 has a replacement selection circuit 45, associativity N−1 has a replacement selection circuit 46, and associativity N has a replacement selection circuit 47.

Each associativity has a unique WayId identifier number, which is used to drive a RepSel signal 33 to a cache I/O 35. Associativities 1, 2, . . . , N–2, and N have been identified, respectively, as WayId 29, WayId 30, WayId 31, and WayId 32. When a TagMiss condition occurs, the associativity that is volunteering for replacement drives the RepSel signal 33. If a TagHit occurs, the associativity that had the TagHit drives the RepSel signal 33. An external control logic 36 sends a specific command to cache 11 that is directed to a group of associativities or a particular associativity. External control logic 36 uses a WayVld signal to qualify for WaySel signal. Preferably, when external control logic 36 qualifies the WaySel signal 28 which matches a WayId of an associativity, the specific command rendered by external control logic 36 is applicable to that associativity only.

There are two situations in which an associativity supplies its WayId through RepSel signals. In the first scenario, an associativity that has a TagHit drives RepSel. See Table A. In the second scenario where an associativity does not have TagHit (i.e., TagMiss) and there is a valid access to cache, OpVld is asserted, the GTagHitB signal 40 is not asserted, GTagHitB is a logic "1", where "B" denotes that the GTagHitB signal is complemented. The cache memory is going to volunteer one associativity under this second scenario for replacement according to the conditions set forth in Table A, which is described below.

Note that there are two GTagHitB signals, one is global and it is driven and used by all associativities and the other one is local for each associativity. The global GTagHitB is asserted, logic "0", if one of the associativities has a TagHit condition. The local GTagHitB is the global GTagHitB signal qualified with a valid access to cache memory. This is OpVld is asserted, logic "1".

As an illustration, associativity 1 is used as a reference point for starting a replacement selection process, although any of the other associativity can initiate the process as well. The associativity with FifoOut asserted starts the replacement selection. Associativity 1 starts the replacement selection after soft-reset. If replacement selection circuit 44 determines that associativity cannot volunteer, associativity 1 requests the next associativity, i.e. associativity 2, to volunteer for replacement by asserting the RepNextOut signal 21 in associativity 1 and the RepNextIn signal 22 in associativity 2. The process continues in a daisy-chain style in a sequential order from associativity 1, 2, . . . , N–1, and to associativity N. If replacement selection circuit 45 determines that associativity 2 cannot volunteer for replacement, associativity 2 requests the next associativity, which in this case is associativity N–1, to volunteer for replacement by asserting the RepNextOut signal 23 in associativity 2 and the RepNextIn signal 24 in associativity N–1. If replacement selection circuit 46 determines that associativity N–1 cannot volunteer for replacement, associativity N–1 requests that associativity N to volunteer for replacement by asserting the RepNextOut signal 25 in associativity N–1 and the RepNextIn signal 26 in associativity N. If replacement selection circuit 47 determines that associativity N cannot volunteer for replacement, associativity N requests the next associativity, in which the replacement algorithm returns to associativity 1, to volunteer by asserting the RepNextOut signal 27 in associativity N and the RepNextIn signal 20 in associativity 1. If the RepNextIn looped back to associativity 1 that started the replacement selection, then the result is that no associativity volunteers for replacement.

Therefore, each associativity has a RepNextIn and FifoOut signals to start the availability for replacement and a RepNextOut signal for propagating to the next associativity for possible replacement. Each associativity in associativities 1, 2, . . . , N–1, and N also has a FifoIn signal 12, 14, 16, 18, and a FifoOut signal 13, 15, 17, 19, respectively for indicating the start and finish of a replacement selection. When a soft reset is asserted, external control logic 36 loads an FIFO bit in associativity 1, 2, . . . , N–1, and N with a logic "0". After a soft reset is de-asserted, a logic "1" is shifted into associativity 1. A FIFO shift signal 39 loads or shifts the FIFO bit in a FiFO bit register.

An Operation Valid , OpVld, signal from the external control logic 36 starts all access to cache memory. Cache memory is going to drive RepSel in response to OpVld being asserted. No signal is asserted if OpVld is not asserted. This includes TagHit for each associativity, global GTagHitB, and local GTagHitB.

The fixed number of signals for implementing a replacement selection circuit in an associativity enables cache 11 to be scalable without incurring costs associated with modifying external control logic 36. Consequently, the number of signals coupled between associativity 1, 2, . . . , N–1, and N and external control logic 36 are the same regardless of the number of associativities scaled in cache 11.

Figure 2:
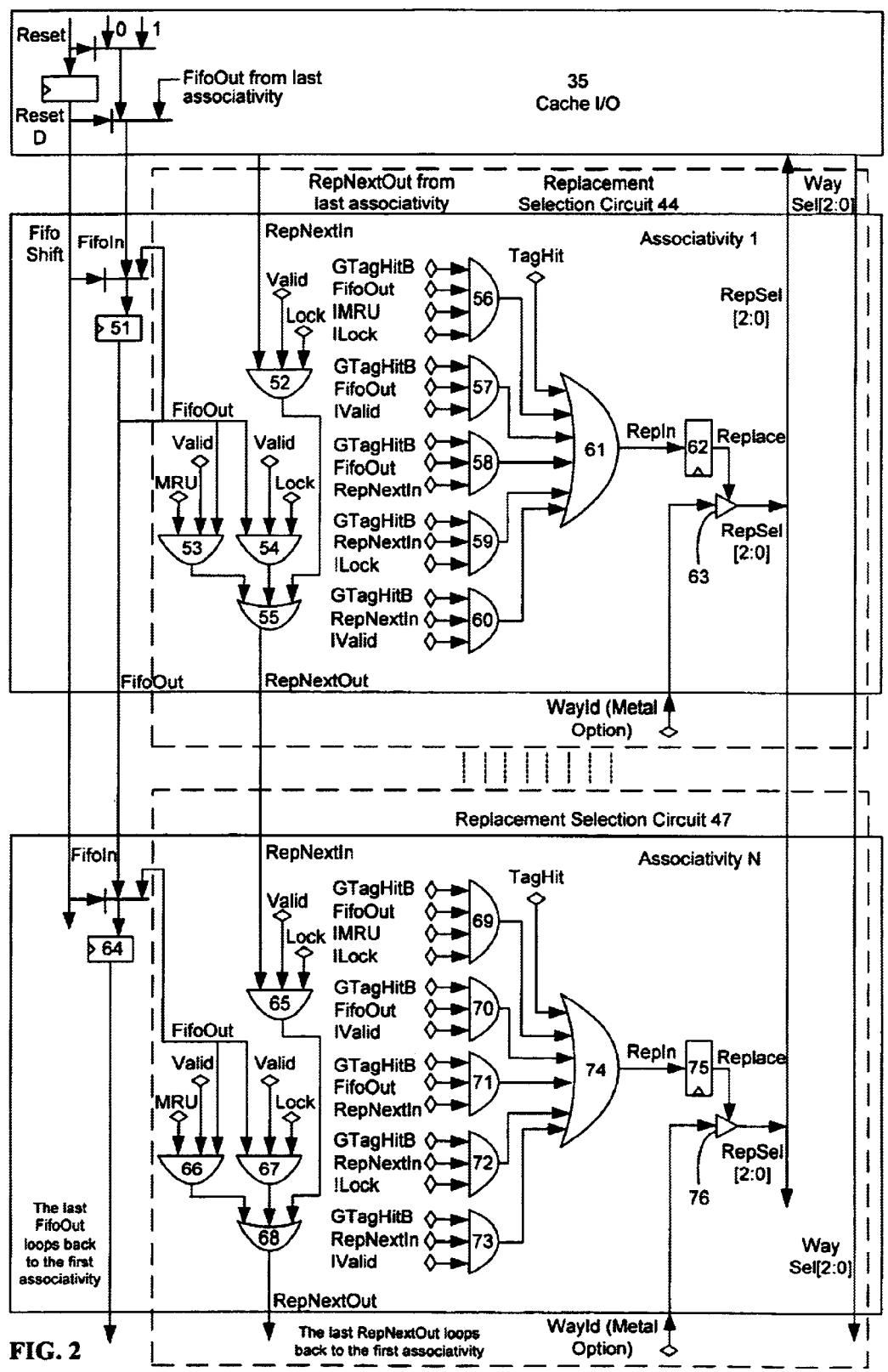
FIG. 2 is a logic diagram illustrating associativity selection by replacement selection circuits in accordance with the present invention.

FIG. 2 is a logic diagram illustrating replacement selection circuits in associativities. Each associativity has a MRU signal, a Valid signal, and a Lock signal that is local to a particular associativity. The replace selection algorithm used is a approximation of NMRU. A LOCK signal trumps a MRU signal, and has a higher priority than the MRU signal. For example, if associativity 2 is not locked, while associativities 1, and 3 through N are locked, then associativity 2 is replaced according to the replacement selection algorithm. In instances where all associativities, i.e. associativities 1 through N are locked, then the replacement selection algorithm selects the associativity with the FifoOut signal asserted for replacement, even if that associativity is locked.

A global tag hit signal (GTagHitB) is globally routed to all associativities and the External Control Logic, where the "B" in "GTagHitB" representing that the signal is complemented. Each associativity has a TagHit signal which is used locally to that associativity and to supply GTagHitB, if TagHit is asserted global GTagHitB is driven to logic "0". If TagHit is not asserted in any associativity global GTagHit stays logic "1". In addition, each associativity qualifies global GTagHitB with OpVld to produce a local GTagHitB signal which is used on the replacement select logic. The default value of global GTagHitB is a logic "1", so it is qualified with OpVld to get a logic "1" in each associativity only when one associativity needs to volunteer for replacement. This is not any TagHit and global GTagHitB that is logic "1".

When RepIn is "1", this enables the associativity to drive RepSel with WayId. In the next clock, the associativity supplies the WayId through the RepSel to the control block, this implies that the associativity can be replaced or had a TagHit. If RepIn is asserted, the WayId is supplied into RepSe. There is only one associativity that is going to supply the WayId signal. Table A shows the input signals for generating a RepIn signal. Note that GTagHitB is local to each associativity, it is qualified with OpVld and "!".

TABLE A

| Output signal | Input Signal | Logical operator | Input signal | Logical operator | Input signal | Logical operator | Input signal | Logical operator | Reference numbers |
|---|---|---|---|---|---|---|---|---|---|
| RepIn = | TagHit | | | | | | | | |
| | GTagHitB | or | FifoOut | and | RepNextIn | or | | | 58, 71 |
| | GTagHitB | and | !Lock | and | RepNextIn | or | | | 59, 72 |
| | GTagHitB | and | !Valid | and | RepNextIn | or | | | 60, 73 |
| | GTagHitB | and | FifoOut | and | !MRU | and | !Lock | or | 56, 69 |
| | GTagHitB | and | FifoOut | and | !Valid | | | | 57, 70 |

A RepIn signal is generated in one of six combinations. Associativity 1 generates a RepIn signal if there is a tag hit through an OR gate 61. An AND 56 gate generates a RepIn signal through OR gate 61 if the GtagHitB signal, the FifoOut signal, the !MRU signal, and the !Lock signal are asserted. Also, an AND gate 57 generates a RepIn signal through OR gate 61 if the GtagHitB signal, the FifoOut signal, and the !Valid signal are asserted. Next, the RepIn signal is generated through OR gate 61 by an AND gate 58 if the GtagHitB signal, the FifoOut signal, and the RepNextIn signal are asserted. Moreover, the RepIn signal is generated through OR gate 61 by an AND gate 59 if the GtagHitB signal, the RepNextIn signal, and the !Lock signal are asserted. Lastly, an AND gate 60 generates a RepIn signal through OR gate 61 if the GtagHitB signal, the RepNextIn signal, and the !Valid signal are asserted.

In associativity N, a RepIn signal is generated if there is a tag hit through an OR gate 74. An AND gate 69 generates a RepIn signal through OR gate 74 if the GtagHitB signal, the FifoOut signal, the !MRU signal, and the !Lock signal are asserted. Also, an AND gate 70 generates a RepIn signal through OR gate 74 if the GtagHitB signal, the FifoOut signal, and the !Valid signal are asserted. Next, the RepIn signal is generated through OR gate 74 by an AND gate 71 if the GtagHitB signal, the FifoOut signal, and the RepNextIn signal are asserted. Moreover, the RepIn signal is generated through OR gate 74 by an AND gate 72 if the GtagHitB signal, the RepNextIn signal, and the !Lock signal are asserted. Lastly, an AND gate 73 generates a RepIn signal through OR gate 74 if the GtagHitB signal, the RepNextIn signal, and the !Valid signal are asserted.

A register 51 in replacement selection circuit 44 stores a FifoIn signal for associativity 1. Also, a register 64 in replacement selection circuit 47 stores a FifoIn signal for associativity N.

Table B shows the input signals for generating a RepNextOut signal. As an illustration, associativity 1 is used as a reference point for generating a RepNextOut signal in three situations, as shown in Table B. An AND gate 52 generates a RepNextOut signal through an OR gate 55 when the RepNextIn signal, the Valid signal, the Lock signal are asserted. A RepNextOut signal is generated through OR gate 55 by an AND gate 53 when the MRU signal, the Valid signal, and the FifoOut signal are all asserted. An AND date 54 also generates a RepNextOut signal through OR gate 55 if the FifoOut signal, the Valid signal, and the Lock signal are asserted. An OR gate 55 receives as inputs from AND gates 52, 53, and 54 for generating a RepNextOut signal from associativity 1 to associativity 2.

Similarly, the RepNextOut signal is generated in associativities 2, . . . N−1, and N. For example, in associativity N, an AND gate 65 generates a RepNextOut signal through an OR gate 68 when the RepNextIn signal, the Valid signal, the Lock signal are asserted. A RepNextOut signal is generated through OR gate 68 by an AND gate 66 when the MRU signal, the Valid signal, and the FifoOut signal are all asserted. An AND date 67 also generates a RepNextOut signal through OR gate 68 if the FifoOut signal, the Valid signal, and the Lock signal are asserted. An OR gate 68 receives as inputs from AND gates 65, 66, and 67 to generates a RepNextOut signal from associativity N to associativity 1.

TABLE B

| Output signal | Input signal | Logical operator | Input signal | Logical operator | Input signal | Logical operator | Reference numbers |
|---|---|---|---|---|---|---|---|
| RepNextOut = | FifoOut | and | Valid | and | MRU | or | 53, 66, 90 |
| | FifoOut | and | Valid | and | Lock | or | 67, 54, 90 |
| | Valid | and | Lock | and | RepNextIn | | 52, 65, 87 |

Figure 3:
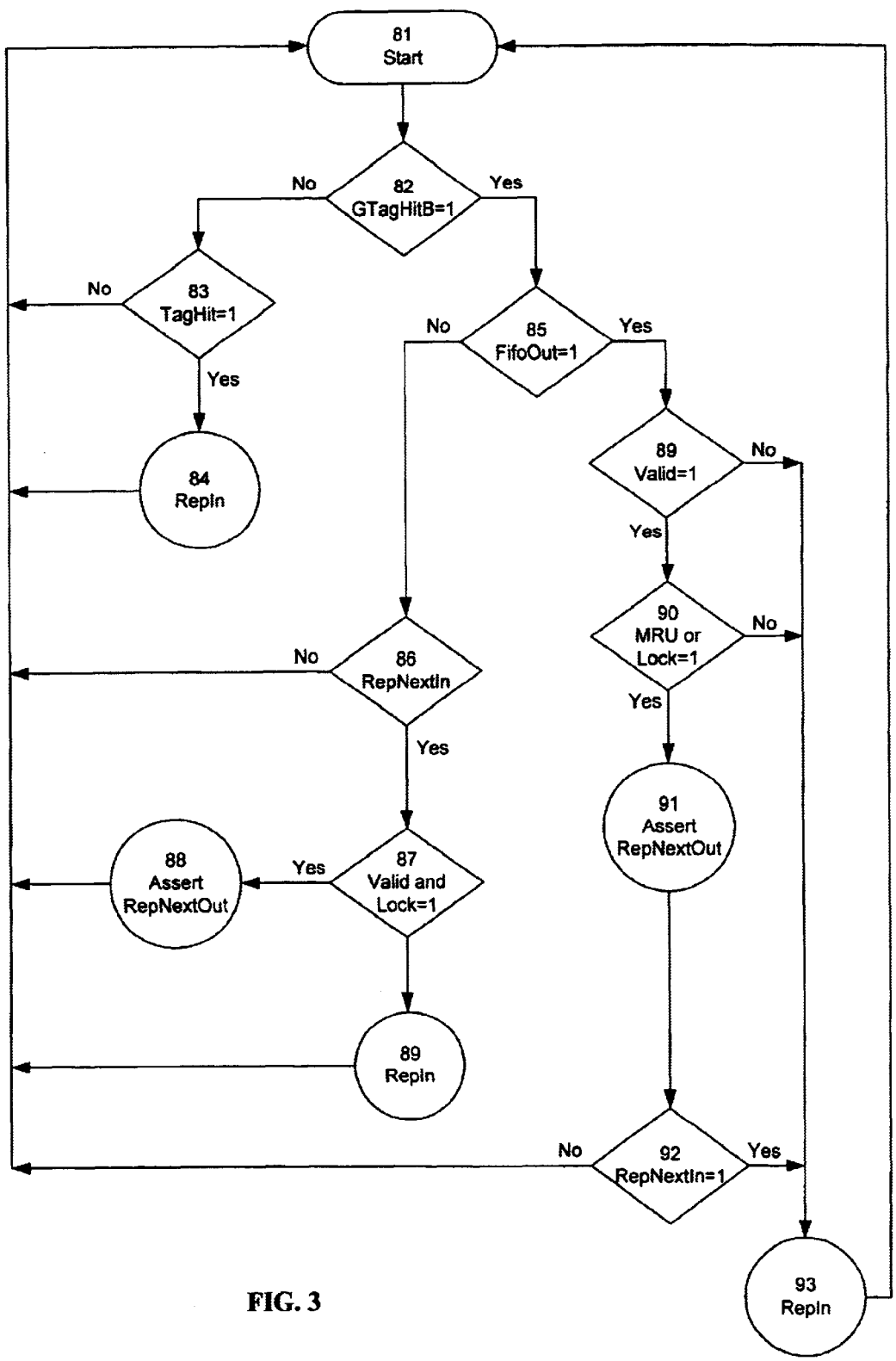
FIG. 3 is a flow diagram illustrating a scalable replacement cache method in a cache memory architecture in accordance with the present invention.

FIG. 3 is a flow diagram illustrating a scalable replacement selection cache method 80. Scalable replacement cache selection method 80 starts 81 to check 82 for the value of the local GTagHitB signal. The local GTagHitB signal is one of the significant signals in scalable replacement cache method 80. On the one hand, if local GTagHitB signal=0, scalable replacement cache method 80 checks 83 for the binary value of a TagHit signal. If a TagHit signal=0, the process returns to start at 81. However, If a TagHit signal=1, the replacement in signal (RepIn) is asserted 84, as shown on the first line in Table A, RepIn=TagHit.

If local GTagHitB signal=1, scalable replacement cache method 80 determines 85 the binary value of a FifoOut signal. If the FifoOut signal=0 or not asserted, associativity does not volunteer for replacement until requested, and the scalable replacement method 80 moves 86 to check if the RepNextIn signal is asserted. If RepNextIn is asserted, logic "1", method 80 moves to 87. In operation 87, if both the Valid signal=1 and the Lock signal=1 in associativity, associativity does not volunteer for replacement and asserts 88 the RepNextOut signal to request the next associativity to volunteer for replacement, as shown in Table B, RepNextOut=Valid and Lock and RepNextIn. Conversely, if the Valid signal≠1 or the Lock signal≠1, the RepIn signal is asserted 89 in associativity.

If the FifoOut signal=1, scalable replacement cache method 80 moves to 89. Scalable replacement cache method

80 determines 89 if a Valid signal is asserted. If the Valid signal is not asserted, scalable replacement cache method 80 asserts 93 the RepIn signal of the next associativity. However, if the Valid signal is asserted, scalable replacement cache method 80 then assesses 90 the binary values of the MRU bit and the Lock bit, as shown in Table B, RepNextOut=FifoOut and Valid and MRU, and RepNextOut=FifoOut and Valid and Lock. When either the MRU≠1 or Lock≠1, the process once again jumps 93 to asserting the RepIn signal. If the MRU bit=1, or the Lock bit=0, scalable replacement cache method 80 asserts 91 the RepNextOut signal and moves to operation 92. When the RepNextIn signal≠1, the scalable replacement cache method 80 returns to start 81. If the RepNextIn signal=1, the scalable replacement cache method 80 proceeds to supply the RepIn signals. Where the RepNextIn=0, the process returns to start 81, and where the RepNextIn=1, the process continues to assert 93 the RepIn signal.

Table C provides a list of signal description used in implementing the replace selection architecture.

TABLE C

| Signal Name | I/O | Src/tgt | Description |
|---|---|---|---|
| clk | I | Clock buffer | Clock |
| Reset | I | External Control | Reset, used to initialize all registers to a known value. |
| ResetD | | Local | Reset Delayed, used to shift "1" once into the first FIFO register. After Reset is deasserted only the first associativity has FifoOut asserted. |
| OpVld | I | External Control | Operation Valid, asserted if the External Control Logic is doing a valid access to cache memory. associativity which WayId matches WaySel is been selected. All other associativities are not enabled. |
| WayId | I | Local to each associativity. | Way Identification, used to enable selecting one associativity. Each associativity has a different WayId. |
| WaySel | I | CacheIo | Way Select, used to select one associativity. The source of these signals is one of the following: Replacement Select (RepSel) from the associativity it self; Virtual Address Select (VASel) from the External Contrl and one of the Miss Registers. The Miss Registers hold RepSel from a previous access and it is to re-access the associativity. |
| RepSel | I/O | Global to all associativity | Replacement Select, driven by the associativity with a Tag Hit condition or by the associativity volunteering for replacement. Note that this information does not have to go out of the cache memory block. It is routed to the Miss Queue and it is stored into a Miss Register and passed to WaySel signals. |

TABLE C-continued

| Signal Name | I/O | Src/tgt | Description |
|---|---|---|---|
| FifoShift | I | External Control | Fifo Shift, used to initialize and to shift a "1/0" in the FIFO bit of each associativity. |
| FifoIn | I | CacheIo or previous associativity. | FIFO Input, used to initialize the FIFO bit register or to shift the FIFO bit from the previous associativity. |
| FifoOut | O | To next associativity or to CacheIo | FIFO Out, it is the value of the FIFO bit register been propagated to the next associativity. |
| RepNextIn | I | From previous associativity. | Replace Next Input, used by the previous associativity to request the next associativity to volunteer for replacement. The name on the previous |
| RepNextOut | O | To next associativity | Replace Next Output, used to request the next associativity to volunteer for replacement. Signal changes name to RepNextIn once in the next associativity. |
| Valid | | Local | Valid Tag signal from Tag Array. Each associativity keeps a local copy and if the local TagHit signal is asserted, it drives the Global Valid signal. |
| Lock | | Local | Lock Tag signal from Tag Array. |
| MRU | | Local | Most Recently Used signal from Tag Array. |
| TagHit | | Local | Tag Hit, associativity has a Tag Hit condition. Instruction/Data request exist in local cache memory. |
| Gvalid | O | Global to all associativities. | Global Valid signal, used to inform the external control logic. This is a open drain signal. It is driven by one associativity at a time but all associativities are connected to it. |
| Glock | O | Global to all associativities | Global Lock signal, used to inform the external control logic. This is a open drain signal. It is driven by one associativity at a time but all associativities are connected to it. |
| GMRU | O | Global to all associativities. | Global MRU signal, used to inform the external control logic. This is a open drain signal. It is driven by one associativity at a time but all associativities are connected to it. |
| | O | Global to all associativities. | Global Tag Hit, used to flag a Tag Hit condition by one of the associativities. |
| GTagHitB | | Global to all associativities | Global Tag Hit Complement, this signal is active low, so a "1" means that there is not a Tag Hit. Note that each associativity has a local copy of this signal qualified with OpVld. So, if the local GTagHitB is a logic "1" then there is a valid access to cache memory and there is not a TagHit condition. |

Table D shows a truth table for generating a RepIn signal and a RepNextOut signal from input signals of TagHit, local GTagHit, FifoOut, RepNextIn, Valid, Lock, and MRU.

TABLE D

| TagHit | GTagHit | FifoOut | RepNextIn | Valid | Lock | MRU | RepIn | RepNextOut |
|---|---|---|---|---|---|---|---|---|
| 1 | X | x | x | x | x | x | 1 | x |
| 0 | 0 | x | x | x | x | x | x | x |
| 0 | 1 | 0 | 0 | 0 | 0 | 0 | 0 | 0 |
| 0 | 1 | 0 | 0 | 0 | 0 | 1 | 0 | 0 |
| 0 | 1 | 0 | 0 | 0 | 1 | 0 | 0 | 0 |

TABLE D-continued

| TagHit | GTagHit | FifoOut | RepNextIn | Valid | Lock | MRU | RepIn | RepNextOut |
|---|---|---|---|---|---|---|---|---|
| 0 | 1 | 0 | 0 | 0 | 1 | 1 | 0 | 0 |
| 0 | 1 | 0 | 0 | 1 | 0 | 0 | 0 | 0 |
| 0 | 1 | 0 | 0 | 1 | 0 | 1 | 0 | 0 |
| 0 | 1 | 0 | 0 | 1 | 1 | 0 | 0 | 0 |
| 0 | 1 | 0 | 0 | 1 | 1 | 1 | 0 | 0 |
| 0 | 1 | 0 | 1 | 0 | 0 | 0 | 1 | 0 |
| 0 | 1 | 0 | 1 | 0 | 0 | 1 | 1 | 0 |
| 0 | 1 | 0 | 1 | 0 | 1 | 0 | 1 | 0 |
| 0 | 1 | 0 | 1 | 0 | 1 | 1 | 1 | 0 |
| 0 | 1 | 0 | 1 | 1 | 0 | 0 | 1 | 0 |
| 0 | 1 | 0 | 1 | 1 | 0 | 1 | 1 | 0 |
| 0 | 1 | 0 | 1 | 1 | 1 | 0 | 0 | 1 |
| 0 | 1 | 0 | 1 | 1 | 1 | 1 | 0 | 1 |
| 0 | 1 | 1 | 0 | 0 | 0 | 0 | 1 | 0 |
| 0 | 1 | 1 | 0 | 0 | 0 | 1 | 1 | 0 |
| 0 | 1 | 1 | 0 | 0 | 1 | 0 | 1 | 0 |
| 0 | 1 | 1 | 0 | 0 | 1 | 1 | 0 | 1 |
| 0 | 1 | 1 | 0 | 1 | 0 | 0 | 1 | 0 |
| 0 | 1 | 1 | 0 | 1 | 0 | 1 | 1 | 0 |
| 0 | 1 | 1 | 0 | 1 | 1 | 0 | 0 | 1 |
| 0 | 1 | 1 | 0 | 1 | 1 | 1 | 0 | 1 |
| 0 | 1 | 1 | 1 | 0 | 0 | 0 | 1 | 0 |
| 0 | 1 | 1 | 1 | 0 | 0 | 1 | 1 | 0 |
| 0 | 1 | 1 | 1 | 0 | 1 | 0 | 1 | 0 |
| 0 | 1 | 1 | 1 | 0 | 1 | 1 | 1 | 1 |
| 0 | 1 | 1 | 1 | 1 | 0 | 0 | 1 | 0 |
| 0 | 1 | 1 | 1 | 1 | 0 | 1 | 1 | 0 |
| 0 | 1 | 1 | 1 | 1 | 1 | 0 | 1 | 1 |
| 0 | 1 | 1 | 1 | 1 | 1 | 1 | 1 | 1 |

The above embodiments are only illustrative of the principles of this invention and are not intended to limit the invention to the particular embodiments described. According, various modifications, adaptations, and combinations of various features of the described embodiments can be practiced without departing from the scope of the invention as set forth in the appended claims.

We claim:

1. A replacement selection system in a cache, comprising:
    a first associativity having a first replacement selection circuit with an input of a first replacement_in (RepNextIn 20) signal, a first output of a first replacement selection (RepSel 63) signal, and a second output of a first replacement_out (RepNextOut 21) signal; and
    a second associativity having a second replacement selection circuit, coupled to the first associativity, with a first replacement_in (RepNextIn 22) signal, a first output of a second replacement selection (RepSel 76) signal, and a second output of a first replacement_out (RepNextOut 23) signal.

2. The system of claim 1, wherein:
    if the first associativity has a TagHit, the first associativity volunteers for replacement by driving the first replacement selection signal; and
    if the first associativity has a TagMiss and there is a valid access to cache, the first associativity volunteers for replacement if a predetermined set of signals are asserted.

3. The system of claim 1, wherein:
    if the second associativity has a TagHit, the second associativity volunteers for replacement by driving the second replacement selection signal; and
    if the second associativity has a TagMiss and there is a valid access to cache, the second associativity volunteers for replacement if a predetermined set of signals are asserted.

4. The system of claim 2, wherein:
    the predetermined set of signals comprises a GtagHitB signal, a FifoOut signal, a Recently Used Associativity (MRU) signal, and a Lock signal,
    the predetermined set of signals comprises a GtagHitB signal, a FifoOut signal, and a Valid signal,
    the predetermined set of signals comprises a GtagHitB signal, a FifoOut signal, and a RepNextIn signal,
    the predetermined set of signals comprises a GtagHitB signal, a RepNextIn signal, and a Lock signal, or
    the predetermined set of signals comprises a GtagHitB signal, a RepNextIn signal, and a Valid signal.

5. The system of claim 1, wherein the first RepNextOut signal is generated from a predetermined set of signals, the predetermined set of signals comprising a FifoOut signal, a Valid signal, and a MRU signal, the predetermined set of signals comprising a FifoOut signal, a Valid signal, and a Lock signal, or the predetermined set of signals comprising a Valid signal, a Lock signal, and a RepNextNextIn signal.

6. The system of claim 1, wherein the first associativity has a first identifier code (WayId 29) and wherein the second associativity has a second identifier code (WayId 30).

7. The system of claim 6 further comprising an external control logic coupled to the first associativity and the second associativity, the external control logic sending a WayValid signal to the first associativity and the second associativity, wherein if the WaySel signal matches the first WayId, the external control logic sends a command to the first associativity, and wherein if the WaySel signal matches the second WayId; the external control logic sends a command to the second associativity.

8. A method for replacement selection of a cache, comprising the steps of:
    providing a first associativity having a first replacement selection circuit with an input of a first replacement_in (RepNextIn 20) signal, a first output of a first replacement selection (RepSel 63) signal, and a second output of a first replacement_out (RepNextOut 21) signal; and providing a second associativity having second replacement selection circuit, coupled to the first associativity, with a first replacement_in (RepNextIn 22) signal, a first output of a second replacement selection (RepSel 76) signal, and a second output of a first replacement_out (RepNextOut 23) signal.

9. The method of claim 8, wherein:

if the first associativity has a TagHit, volunteering the first associativity for replacement by driving the first replacement selection signal; and if the first associativity has a TagMiss and there is a valid access to cache, volunteering the first associativity for replacement if a predetermined set of signals are asserted.

10. The method of claim 8, wherein:

if the second associativity has a TagHit, volunteering the second associativity for replacement by driving the second replacement selection signal; and if the second associativity has a TagMiss and there is a valid access to cache, volunteering the second associativity for replacement if a predetermined set of signals are asserted.

11. The method of claim 9, wherein:

the predetermined set of signals comprises a GtagHitB signal, a FifoOut signal, a MRU signal, and a Lock signal, the predetermined set of signals comprises a GtagHitB signal, a FifoOut signal, and a Valid signal, the predetermined set of signals comprises a GtagHitB signal, a FifoOut signal, and a RepNextIn signal, the predetermined set of signals comprises a GtagHitB signal, a RepNextIn signal, and a Lock signal, or the predetermined set of signals comprises a GtagHitB signal, a RepNextIn signal, and a Valid signal.

12. The method of claim 8, wherein the first RepNextOut signal is generated from a predetermined set of signals, the predetermined set of signals comprising a FifoOut signal, a Valid signal, and a Recently Used Associativity (MRU) signal, the predetermined set of signals comprising a FifoOut signal, a Valid signal, and a Lock signal, or the predetermined set of signals comprising a Valid signal, a Lock signal, and a RepNextNextIn signal.

13. The system of claim 8, further comprising the steps of:

identifying the first associativity with a first identifier code (WayId 29); and identifying the second associativity with a second identifier code (Way 30).

14. The method of claim 13 further comprising the step of sending a WayValid signal from an external control logic to the first associativity and the second associativity, wherein if the WaySel signal matches the first WayId, the external control logic sends a command to the first associativity, and wherein if the WaySel signal matches the second WayId, the external control logic sends a command to the second associativity.

* * * * *